Figures 1, 2:
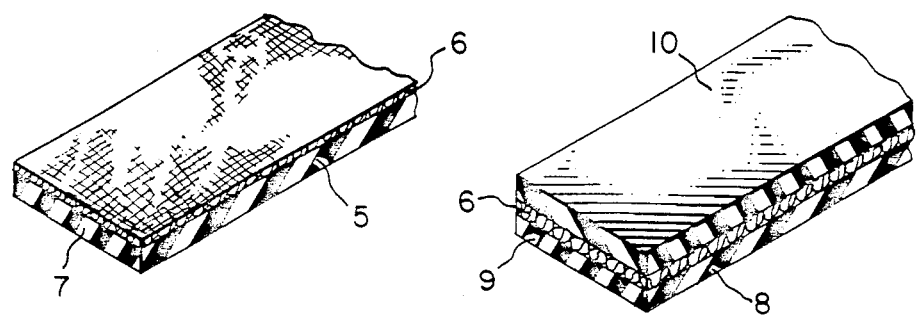

United States Patent [19]

Chapman et al.

[11] Patent Number: 4,745,023

[45] Date of Patent: May 17, 1988

[54] ENDLESS FLEXIBLE BELT OR BAND

[75] Inventors: Gregory A. Chapman; Melvin W. King; David J. Maguire; Eugene R. Zitek, all of Lincoln, Nebr.

[73] Assignee: The Goodyear Tire & Rubber Company, Akron, Ohio

[21] Appl. No.: 889,058

[22] Filed: Jul. 22, 1986

[51] Int. Cl.⁴ .................. B65G 15/34; B65H 3/04; F16G 1/10
[52] U.S. Cl. .................. 428/230; 198/847; 198/957; 271/34; 428/339; 428/909
[58] Field of Search .............. 428/230, 909, 339; 198/847, 957; 271/34

[56] References Cited

U.S. PATENT DOCUMENTS

| | | |
|---|---|---|
| 3,468,834 | 9/1969 | Oda et al. |
| 3,679,044 | 7/1972 | McGinnis .............. 198/847 |
| 3,768,803 | 10/1973 | Stange . |
| 3,872,735 | 3/1975 | Hnatek ................. 198/847 |
| 3,931,090 | 1/1976 | Amatangelo . |
| 3,944,060 | 3/1976 | Hartmann ............. 198/847 |
| 4,106,613 | 8/1978 | Thomson ............... 198/847 |
| 4,371,580 | 2/1983 | Morrison et al. ...... 198/847 |
| 4,410,082 | 10/1983 | McGinnis ............. 198/847 |
| 4,469,729 | 9/1984 | Watanabe et al. .... 428/908.8 |

Primary Examiner—James C. Cannon
Attorney, Agent, or Firm—J. D. Wolfe; M. R. Dion, Sr.

[57] ABSTRACT

A belt or band for machines such as xerographic for feeding, transporting, separating or sorting materials comprising an endless flexible elastomeric belt having a layer of stretch fabric to improve the resistance to flex cracking of said belt.

5 Claims, 1 Drawing Sheet

ENDLESS FLEXIBLE BELT OR BAND

TECHNICAL FIELD

The present invention relates to an endless flexible feed or transport type elastomeric belt or band having improved flex life. More particularly, this invention relates to an endless flexible elastomeric belt or band characterized by having a stretch fabric attached thereto or embedded therein to give the band at least two laminae.

PRIOR ART

Prior to the introduction of high speed systems, standard rubber belts or bands were sufficient for the manufacture of paper feed belts, paper transporting belts, paper separating belts and paper sorting belts where stress upon such belts or bands was minimal, and there was little or no mechanical or physical degradation due to dynamic stress upon the rubber. However, when conventional rubbers are used in high speed systems, the belt degrades due to stress caused by current high speed systems, such as flexible feed belts in sheet feeders, transporters or separators in xerographic machines. Hence the useful life of such belts is shortened considerably requiring early replacement, loss of use of the system and the need to call an expert mechanic to service the system with its attendant high cost.

Consequently, there has been much research and development work to improve these belts essentially directed to compounding the elastomers to get better flex line. Representative of this effort is the teaching of U.S. Pat. No. 3,931,090 where polyisoprene is compounded to provide high resistance to physical degradation due to dynamic mechanical stress of the belt under operating conditions.

The nature of these mechanical devices and how to make the belts for them is shown in U.S. Pat. Nos. 3,468,834 and 3,768,803.

THE INVENTION

We have discovered that the life of an endless flexible elastomeric belt or band can be improved by the manner in which the band is built. For instance, any rubber or elastomer used to build the belts for purposes of this invention can be improved by using the rubber as compounded to fabricate a belt as claimed herein.

More specifically, this improved belt or band comprises an elastomeric member having an elastic fabric member adhered thereto either with none or one or more elastomeric members banded to the other side of the elastic fabric member and cured into an endless flexible belt or band. Such a belt or band exhibits improved resistance to failure by flex cracking and improved strength.

The nature of this invention and its construction and advantages can be seen by reference to the drawings where FIG. 1 is a partial perspective view of a belt having the stretch fabric on the rubber ply.

Figure 3:

FIG. 2 is a partial perspective view of another embodiment of the belt containing two plies of rubber and FIG. 3 is a view of the stretch fabric.

Any of the elastomers used to make flexible paper feed belts, sheet feeders, transporters or separators can be used; representative of these are EPDM rubber, butyl rubber, neoprene rubber, natural rubber, polyisoprene GRS, polybutadiene, acrylonitrile polybutadiene acrylonitrile to mention the common ones.

These rubbers can be compounded with the usual compounding agents such as fillers viz carbon black or silica types, curatives such as sulfur, sulfur accelerators or peroxides, internal releases viz the stearates and antioxidants and cured to yield a finished belt of the conventional width and thickness. The stretch fabric members are those defined by ASTM Method D-123 as a woven fabric which is capable of at least 20 percent stretch in either warp or filling direction, or both, under loads and conditions encountered in use, and of almost complete recovery on removal of the load. Stretch fabrics are sometimes referred to as of two types, power stretch fabrics and comfort stretch fabrics. These stretch fabrics may have elastomer incorporated therein usually less than 15% and the fabric may be of any of the well known ones such as nylon or polyester.

It is preferred to rubberize these stretch fabrics by dipping in an elastomeric dip such as the well known blend of natural rubber latex and phenalformaldehyde dips viz the RFL dips used to impart good rubber adhesion to the fabric, although any other fabric-rubber adhesive may be used.

The Handbook of Industrial Textiles, Pages 100–101, describes these so-called textured yarns. A preferred one is the Helanca torque type, a nylon yarn, where the continuous filament yarn is twisted, the twist is set with heat, water or steam and then the yarn is untwisted. Also the texturized crimp type may be used. A series of belts were made using either texturized crimp yarn or Helanca yarns of nylon as the stretch fabric. The stretch fabric was passed through an RFL dip bath to coat the fabric with elastomer which was heated to dry off the water in the latex in the normal manner.

A series of rubber compounds were made such as a polyisoprene rubber or polybutadiene rubber, 6 to 15 parts of zinc oxide, 1 to 5 parts of stearic acid, 0.1 to 5 parts sulfur, accelerator carbon black and antioxidant and extruded into bands of about 0.4, 0.6, 0.9 and 1.2 centimeters wide. Sets of the extruded rubber ply 5 were covered with a layer 6 of RFL dipped stretched fabric as shown in FIG. 1 and the ends 7 joined on a mandrel (not shown) to form an endless band and cured at elevated temperature to give an improved endless flexible belt having improved resistance to flex failure relative to a belt made with the same rubber and cured identically except the stretched fabric was omitted.

Other belts were made by laying up a first rubber ply 8 on a table (not shown).

A layer 9 of rubberized stretched fabric was placed on ply 8 as shown in FIG. 2 and then a second rubber ply 10 was placed on layer 9 to give a lamina. The ply 10 may be of the same or different thickness relative to ply 8. The lamina preferably was placed on a building mandrel which may have a textured surface to facilitate feeding, transporting and sorting of the paper or related material and then they are pressed together to cause the ends to adhere when cured.

The shaped lamina was cured to give an endless flexible belt or band having improved resistance to flex failure. When these cured belts were tested with the high torque slip test, they exhibited less slip than bands without the stretch fabric. Also, in tests on commercial equipment it was observed that the stretch fabric stopped the growth of flex cracks.

Although the emphasis has been on belts for paper transport and copier bands, it should be appreciated that it could be used anywhere belts and bands of this conveying type are used, for instance, on vacuum cleaners.

While certain representative embodiments and details have been shown for the purpose of illustrating the invention, it will be apparent to those skilled in this art that various changes and modifications may be made therein without departing from the scope of the invention.

What is claimed is:

1. A high speed flexible endless belt or band of the type used as a paper or sheet handling band, said band having improved flex life under high stress comprising an elastomeric member or members having an elastic stretch fabric member adhered on the surface or just beneath the surface of said elastic band to reduce the tendency of the elastomer to fail by flex cracking.

2. The band of claim 1 wherein the layer of stretch fabric is adhered to the top surface of said band.

3. The band of claim 1 wherein the layer of stretch fabric is adhered 0.1 to 0.6 centimeters beneath surface of said belt to give at least two layers of elastomer.

4. The band of claim 1 wherein the layer of elastic fabric is a polyamide fabric.

5. the band of claim 1 wherein the stretch fabric has been elastomerically coated to cause the fabric to be just beneath the surface of said band.

* * * * *